Sept. 3, 1963     N. H. TROSTEL     3,102,427
PRESSURE GAUGE CONNECTOR
Filed May 23, 1961
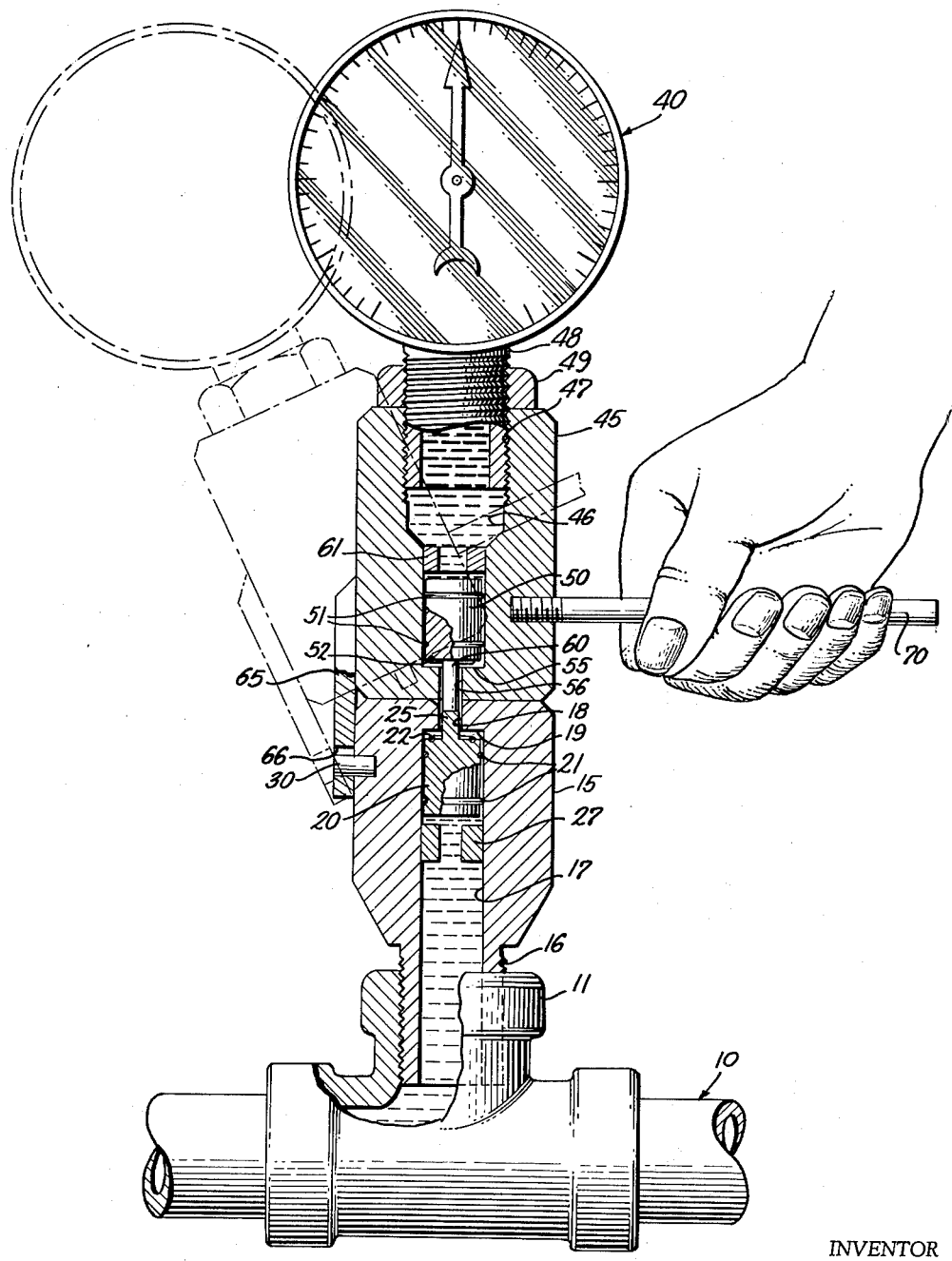
INVENTOR
*Norris H. Trostel*
BY *Irons, Birch, Swindler & McKie*
ATTORNEYS 3,102,427
PRESSURE GAUGE CONNECTOR
Norris H. Trostel, Corpus Christi, Tex.
(2503 E. 25th Place, Tulsa 14, Okla.)
Filed May 23, 1961, Ser. No. 112,061
9 Claims. (Cl. 73—420)

This invention relates generally to apparatus for selectively determining the fluid pressures existent at a plurality of locations in a system of fluid pressure lines. More particularly, it relates to a connector usable with a fluid pressure gauge or other pressure registering device whereby a single gauge or device may be rapidly and easily coupled and uncoupled in succession with a plurality of locations in fluid pressure lines to determine the pressures within the lines at the points of coupling without releasing the fluid pressure within the lines.

There are many industries where the determination of fluid pressures at a plurality of locations and at various time intervals is desired. One example occurs in the petroleum industry wherein it is frequently necessary to obtain readings of liquid or gas pressures existent at various locations in the different pipeline systems required, in connection with oil production and oil refining.

The permanent installation of a separate pressure gauge or other pressure registering device at each location in the pipeline system at which the determination of fluid pressure is to be desired, not only involves a substantial investment in the cost of numerous gauges required, but also creates a substantial maintenance problem in keeping the numerous gauges in repair to give accurate readings. This repair problem for the many gauges is accentuated where the permanently installed gauges are continuously exposed to rapidly pulsating pressures which accelerates wear of the gauge parts requiring early replacement or frequent repair.

To avoid the necessity for having a large number of separate pressure registering devices, various proposals have been made whereby a single pressure gauge or pressure registering device can be used at a plurality of locations in a pressure line system by merely connecting and disconnecting the gauge to the system at the particular location for which the pressure at that time is to be determined. The connector constructions employed in these prior proposals have been prone to develop leaks. Also, these proposals have had the drawback of allowing fluid within the pressure line to bleed therefrom when the pressure gauge or pressure registering device is engaged or disengaged at the location where the pressure reading is to be taken.

Considering the drawbacks of the prior pressure gauge connectors as described above, it is a primary object of the instant invention to provide improved apparatus which will facilitate determining with a single pressure registering device the fluid pressures existing at a plurality of locations in a system of pressure lines.

It is another important object to provide apparatus in accordance with the above object which is provided with quickly engageable means for readily and releasably connecting the pressure registering device selectively to the locations in the pressure line system.

Further in accordance with the above objects, it is an objective herein to provide apparatus by use of which the fluid within the pressure line system is at no time released incidental to determining the fluid pressures at the selected locations.

Another object of the invention is to provide apparatus for testing fluid pressures at selected locations in a pressure line system wherein an adapter is provided at each of the locations in the pressure line system at which determination of fluid pressure is desired and a single coupler mounting a pressure registering device is provided for successive connection with each adapter.

It is also an object in accordance with the last of the above objects to provide apparatus wherein the adapter and coupler have a fulcrum pin and a fulcrum bar connection for readily and speedily connecting the adapter and coupler at each of the locations.

A further object is to provide a pressure gauge connector apparatus incorporating quickly engageable means for connecting an adapter and coupler at each of the desired locations and wherein a piston is mounted within each of the adapter and coupler with an extension engageable between the adapter piston and coupler piston when the adapter and coupler are connected so that movement of the adapter piston in response to pressure changes within the adapter will be transmitted to the coupler piston which in turn actuates the pressure registering device.

The above and other objects and novel features of the instant invention will be readily apparent from the following description taken in connection with the accompanying drawing. It is to be expressly understood that the drawing is for the purposes of illustration and is not intended to define the limits of the invention but rather to merely illustrate a preferred embodiment and structure incorporating the features of the instant invention.

In the accompanying drawing forming a part of this specification and wherein like reference numerals are employed to designate like parts, the single view is a sectional view showing the connector as employed with a pipeline system for determining pressure at a particular location in the system.

On the drawing the reference numeral 10 generally designates a portion of a pipeline system which may carry fluid in the form of a gas or liquid under pressure. The pipeline as illustrated is provided with a suitable T 11 by means of which the gauge connector of the instant invention may be installed to permit reading out the fluid pressure existing in line 10 at the location of T 11. Although the line 10 has been shown provided with a T 11, it will readily be appreciated that any suitable fitting which would be appropriate for permanent installation of a pressure gauge to indicate the pressure within the line may be employed for installation of the gauge connector of the instant invention.

The gauge connector includes an adapter 15 which has an externally threaded stem 16 engaged with the internal threads of T 11 to mount the adapter. The adapter has a cylindrical bore 17 which connects with the interior of T 11 and thereby with pipeline 10 such that fluid within line 10 communicates with bore 17.

The end of adapter 15 opposite stem 16 has an opening 18 which is coaxial with bore 17 but of a smaller diameter whereby an inwardly facing shoulder 19 is provided at the end of bore 17. A piston 20 is slidably mounted in bore 17. This piston is provided with suitable grooves on the external cylindrical surface thereof to retain O-ring seals 21. These seals engage with the internal wall of bore 17 to prevent leakage of fluid between the piston 20 and the wall of bore 17. An additional O-ring seal 22 is mounted in a groove at the outer end of piston 20. This latter seal serves as a final seal against leakage of fluid between the bore 17 and piston 20 when the piston is fully extended to engage shoulder 19 at the outer end of bore 17.

The piston 20 carries an extension 25 which extends outwardly through opening 18 when the piston 20 is fully extended within bore 17. A retaining ring 27 is mounted within bore 17 inwardly of piston 20 to retain the piston within the bore when the adapter is being transported to the point of installation or in the event of unreasonably low pressure occurring within the pressure line to which the adapter is connected which would tend to draw the piston into the pressure line.

A fulcrum pin 30 is mounted to extend laterally outwardly from the side of adapter 15. This pin cooperates with the fulcrum bar described hereinafter in conjunction with connecting the gauge carrying coupler to the adapter to determine the pressure within the line 10.

A pressure registering device, such as the conventional pressure gauge 40 shown on the drawing, is mounted on a coupler 45. Coupler 45 is provided with a passage 46 which has the outer end thereof internally threaded at 47. The externally threaded nipple 48 on gauge 40 is engaged with threads 47 to mount the gauge on coupler 45. A lock nut 49 may be provided to rigidly fix the gauge in the desired relation to coupler 45.

The inner end of passage 46 has a portion of reduced diameter in which is mounted a piston 50. Suitable grooves are provided on the exterior cylindrical surface of piston 50 with O-ring seals 51 received in the grooves to encircle the piston. The end of piston 50 is provided with an annular groove which receives an O-ring seal 52 that engages the shoulder 55 at the end passage 46 in the fully extended position of piston 50. An opening 56 is provided coaxially aligned with passage 46. The piston 50 carries an extension 60 which extends through opening 56 and engages with extension 25 on piston 20 when the coupler 45 and adapter 15 are interconnected in the relation as shown on the drawing. The passage 46 and passage within the gauge 40 are filled with a suitable liquid so that movements of the piston 50 will be transmitted to operate the gauge 40 in proportion to such movements. A retaining ring 61 is mounted in passage 46 to retain the piston 50 against displacement from the coupler 45 should the gauge 40 be disconnected.

A fulcrum bar 65 is mounted on one side of coupler 45 to extend beyond the face of the coupler through which extension 60 projects. An opening 66 is provided at the end of the fulcrum bar to engage with the pin 30 mounted on adapter 15.

A suitable handle member 70 is provided on coupler 45 to be grasped by the user of the gauge connector in effecting the connecting and disconnecting of the adapter and coupler as will be described hereinafter.

Reference may now be had to the manner in which the gauge connector structure described hereinabove is used. Initially the pressure line system in which pressure readings are to be taken at various locations and at different times will be provided with an adapter 15 at each of the locations in the system where the taking of a pressure reading will be desired. With the adapters mounted at the desired locations, as for example by each adapter being threaded into a pipe fitting at each selected location in the pipeline system in the manner of connection of adapter 15 with T 11, the fluid pressure will act on the inner face of the piston 20 within each adapter urging this piston outwardly. In this state, the piston 20 within each adapter 15 by reason of the O-ring seals 21 and 22 thereon will prevent escape of fluid from the pressure line. With the particular length of extension 25 shown on the drawing the outer end of this extension will lie substantially flush with the outer end of adapter 15.

When it is desired to obtain a pressure reading at a particular location that has been provided with an adapter 15, the coupler 45 connected to a pressure registering device, as for example a pressure gauge 40 such as shown in the drawings, is to be positioned to overlie the adapter 15 in the position shown on the drawing. The engagement of coupler 45 with adapter 15 is carried out by positioning the coupler as shown in phantom on the drawing with opening 66 in fulcrum bar 65 engaged with pin 30 on adapter 15. By rocking the coupler 45 from this position by means of the handle member 70 the coupler is swung from the position shown in phantom to the full line position.

In the course of this movement the extension 60 on piston 50 will engage extension 25 on piston 20 forcing piston 20 downwardly against the fluid pressure existent within bore 17 and pipeline 10. The force required to displace piston 20 against this fluid pressure will be transmitted to the liquid body maintained within passage 46 in coupler 45. This liquid body completely fills passage 46 and the passage within the pressure gauge 40 such as for example a Bourdon tube passage within the gauge.

With the coupler 45 moved into the full line position shown on the drawing, the fulcrum bar 65 by reason of its engagement with fulcrum pin 30 holds one side of the coupler and adapter together while maintaining them in alignment so that the openings 18 and 56 are coaxial. The coupler may be held in position by means of handle member 70 for the desired length of time to enable reading the pressure from the dial of gauge 40.

It will be appreciated that with the pistons 20 and 50 disposed as shown on the drawing the pressure within bore 17 will be applied against the inner end of piston 20 creating a force which is transmitted through extensions 25 and 60 to piston 50 which in turn forces liquid from passage 46 into the pressure gauge where a representation of the line pressure will be exhibited by the position of the pointer of the gauge relative to the gauge scale. By properly calibrating the scale of gauge 40 relative to the position of pistons 20 and 50, the pressure within line 10 can be read directly on the dial scale of gauge 40. As the pressure in line 10 increases or is of greater magnitude, the piston 20 will be forced further outwardly in bore 17 and will in turn displace piston 50 to cause a corresponding degree of movement of the pointer of gauge 40 along its scale. Likewise when the pressure diminshes or is of a lesser magnitude piston 20 will be disposed further inwardly within bore 17 and piston 50 will release pressure built up within the liquid such that the gauge pointer will show a lower degree of fluid pressure on the dial scale.

Once the pressure reading has been taken the coupler 40 carrying the gauge may be readily removed by rocking the coupler to the phantom line position and disengaging fulcrum bar 65 from pin 30. In the course of this operation, piston 20 will return to its extended position with all three seals 21 and 22 functioning to prevent loss of fluid from line 10. Also the operation of the pressure gauge 40 will return the liquid to coupler 45 urging the piston 50 downwardly so that its seals 51 and 52 will prevent leakage of the body of liquid from within passage 46. Since there is only limited movement of the pistons 20 and 50 in obtaining any pressure reading at a location having an adapter 15, the wear on the piston seals is negligible.

Although in the embodiment specifically illustrated pressure responsive wall means have been illustrated in the form of pistons 20 and 50, it is to be understood that other structures such as diaphragms, etc. may be employed within the scope of the instant invention. By the same token, depending upon the particular pressure registering device that is employed, the movement of piston 50 withing coupler 45 or movement of some other pressure responsive wall means used in place of piston 50 may be connected to directly actuate the pressure registering device instead of employing the trapped body of liquid to operate the device as is specifically disclosed hereinabove.

Another specific feature which may be changed from that illustrated on the drawing or within the scope of the instant invention has to do with the extensions 25 and 60 on pistons 20 and 50, respectively. A single extension may be employed disposed between the pistons 20 and 50 when the adapter and coupler are interconnected, the important thing being that the pistons or other pressure responsive movable wall means be essentially "floating" so that the movable wall means are so interconnected that movements of one wall means in response to the source pressure will be transmitted to the other wall means which in turn actuates the pressure registering device.

It is to be understood that the form of this invention herewith shown and described is to be taken as a preferred example of the same and that various changes in shape, size and arrangement of the parts may be resorted to without departing from the spirit of the invention or the scope of the appended claims.

I claim:

1. In apparatus for selectively determining the fluid pressures existent at a plurality of locations in a system of pressure lines by selectively attaching a pressure registering device to the locations comprising an adapter member having a bore therein, said member having means at one end thereof for attaching said member to the pressure line at one of said locations with one end of said bore in communication with the pressure within the pressure line at such one location, first pressure responsive wall means closing the opposite end of said bore and being movable in response to changes in pressure within said bore, means associated with said first wall means to limit movement of such wall means away from the end of said bore, a coupler member having means for attaching the pressure registering device to said coupler member, second pressure responsive wall means mounted on said coupler member to actuate by movements thereof the pressure registering device carried by said coupler member, extension means projecting outwardly beyond the end of at least one of said members to extend between and engage with said pressure responsive wall means of said adapter member and said coupler member, and quickly interengageable means mounted on said members for readily and releasibly connecting said members with said extension means engaged with both said pressure responsive wall means whereby movements of said first pressure responsive wall means will be transmitted through said extension means to said second pressure responsive wall means to actuate the pressure registering device.

2. In an apparatus for selectively determining the fluid pressures existent at a plurality of locations in a system of pressure lines by selectively attaching a pressure registering device to the locations comprising an adapter member having a bore therein, said member having means at one end thereof for attaching said member to the pressure line at one of said locations with one end of said bore in communication with the pressure within the pressure line at such one location, first pressure responsive wall means closing the opposite end of said bore and being movable in response to changes in pressure within said bore, a coupler member having means for attaching the pressure registering device to said coupler member, second pressure responsive wall means mounted on said coupler member to actuate by movements thereof the pressure registering device carried by said coupler member, extension means projecting outwardly beyond the end of at least one of said members to extend between and engage with said pressure responsive wall means of said adapter member and said coupler member, a fulcrum pin extending laterally outwardly from one of said members, a fulcrum bar carried by the other of said members and having an opening therein to engage said bar with said fulcrum pin, and handle means formed on said coupler member to manipulate said members in engaging said fulcrum bar with said fulcrum pin to draw said members together with said extension means engaged with both said pressure responsive wall means and hold said members connected whereby movements of said first pressure responsive wall means will be transmitted through said extension means to said second pressure responsive wall means to actuate the pressure registering device.

3. In apparatus for selectively determining the fluid pressures existent at a plurality of locations in a system of pressure lines by selectively attaching a pressure registering device to the locations comprising an adapter member having a bore therein and a fulcrum pin extending outwardly from one side of said member, said member having means at one end thereof for attaching said member to the pressure line at one of said locations with one end of said bore in communication with the pressure within the pressure line at such one location, first pressure responsive wall means closing the opposite end of said bore and being movable in response to changes in pressure within said bore, a coupler member having means for attaching the pressure registering device to said coupler member, an apertured fulcrum bar secured to and extending outwardly beyond one end of said coupler member, second pressure responsive wall means mounted on said coupler member to actuate by movements thereof the pressure registering device carried by said coupler member, extension means projecting outwardly beyond the end of at least one of said members to extend between and engage with said pressure responsive wall means of said adapter member and said coupler member, said fulcrum bar aperture being readily and releasibly engageable with the outwardly extending fulcrum pin on said adapter member to draw said members together with said extension means engaged with both said pressure responsive wall means and hold said members connected whereby movements of said first pressure responsive wall means will be transmitted through said extension means to said second pressure responsive wall means to actuate the pressure registering device.

4. In apparatus for selectively determining the fluid pressures existent at a plurality of locations in a system of pressure lines by selectively attaching a pressure registering device to the locations comprising an adapter member having a bore therein, said member having means at one end thereof for attaching said member to the pressure line at one of said locations in a pressure line with one end of said bore in communication with the pressure in such line, piston means slidably mounted in said bore, retaining means on said adapter to prevent said piston means from being displaced outwardly of the opposite end of said bore, a coupler member having means at one end thereof for attaching the pressure registering device to said coupler member, piston means slidably mounted within said coupler member with means on said coupler member to prevent such piston means from being disengaged from said coupler member, means for connecting the coupler member mounted piston means to actuate the pressure registering device in response to movements of such piston means within said coupler member, at least one of said piston means having extension means projecting outwardly beyond the end of the member with which it is associated, and quickly interengageable means mounted on said members for readily and releasibly connecting said members with said extension means engaging both of said piston means whereby movements of said piston means in said adapter member will be transmitted through said extension means to the coupler member mounted piston means to actuate the pressure registering device.

5. In apparatus for selectively determining the fluid pressures existent at a plurality of locations in a system of pressure lines by selectively attaching a pressure registering device to the locations comprising an adapter member having a cylindrical bore therein with an annular shoulder at one end of said bore, said member having means at one end thereof for attaching said member to the pressure line at one of said locations with the bore in communication with the pressure within the pressure line at such one location, a piston slidably mounted in said bore, said piston having at least one O-ring seal mounted thereon to seal between said piston and the wall of said bore, a coupler member having a cylindrical passage therein with means at one end thereof for attaching the pressure registering device in fluid communication with said passage, a piston slidably mounted in said passage, said piston having at least one O-ring seal mounted thereon to seal between said piston and the wall of said passage, means for connecting the coupler member mounted piston to actuate the pressure registering device in response to movements of such piston within said passage, at least one of said pistons having extension means projecting outwardly beyond the end of the member with which it is associated, and quickly interengageable means mounted on said members for readily and releasibly connecting said members with said extension means engaging both of said pistons whereby movement of said piston in said adapter member will be transmitted through said extension means to the coupler member mounted piston means to actuate the pressure registering device.

6. In apparatus as recited in claim 5 wherein said piston mounted within the adapter bore is further provided with an O-ring seal on the end thereof to seal against said annular shoulder when such piston is urged outwardly of the bore by pressure within the line to which the adapter is attached.

7. In apparatus for selectively determining the fluid pressures existent at a plurality of locations in a system of pressure lines by selectively attaching a pressure registering device to the locations comprising an adapter member having a cylindrical bore therein with an annular shoulder at one end of said bore and a fulcrum pin extending outwardly from one side of said member, said member having means at one end thereof for attaching said member to the pressure line at one of said locations with the bore in communication with the pressure within the pressure line at such one location, a piston slidably mounted in said bore and engageable with said shoulder in its outwardly extending position, said piston having at least one O-ring seal mounted thereon to seal between said piston and said bore, a coupler member having a cylindrical passage therein with means at one end thereof for attaching the pressure registering device in fluid communication with said passage, a piston slidably mounted in said passage, said piston having at least one O-ring seal mounted thereon to seal between said piston and said passage, means for connecting the coupler member mounted piston to actuate the pressure registering device in response to movements of such piston within said passage, an apertured fulcrum bar secured to and extending outwardly beyond one end of said coupler member, at least one of said pistons having extension means projecting outwardly beyond the end of the member with which it is associated, said fulcrum bar aperture being readily and releasibly engageable with the outwardly extending fulcrum pin on said adapter member to draw said members together with said extension means engaged with both said pistons and hold said members connected whereby movements of the adapter mounted piston will be transmitted through said extension means to the coupler piston to actuate the pressure registering device.

8. In apparatus as recited in claim 7 wherein said O-ring seals encircle said pistons and the adapter mounted piston is further provided with a seal on the end thereof to engage with said annular shoulder when such piston is urged outwardly of the bore by pressure within the line to which the adapter is attached.

9. A pressure gauge connector comprising an adapter member having a bore therein, said member having thread means at one end thereof for attaching said member to a pressure line with one end of said bore in communication with the pressure in such line, piston means slidably mounted in said bore, retaining means on said adapter to prevent said piston means from being displaced outwardly of the opposite end of said bore, a coupler member having a passage therein, thread means at one end of said passage for attaching said coupler member in fluid communication with a pressure gauge, piston means slidably mounted in said passage with means on said coupler member to prevent such piston means from being displaced outwardly of the opposite end of said passage, extension means extending outwardly from at least one of said piston means and projecting beyond the end of at least one of said members, and quickly interengageable means mounted on said members for readily and releasibly connecting said opposite end of said bore and said passage in alignment with said extension means engaging both of said piston means to displace said piston means in said adapter member inwardly of the adapter bore and away from said retaining means on said adapter member whereby movements of the adapter member piston means will be transmitted to the coupler member piston means to actuate the pressure gauge.

References Cited in the file of this patent

UNITED STATES PATENTS

| 1,898,257 | Nelson | Feb. 21, 1933 |
| 2,667,184 | Hailer et al. | Jan. 26, 1954 |

FOREIGN PATENTS

| 778,320 | France | Dec. 22, 1934 |